G. H. WHEARY

Nov. 29, 1932. BAGGAGE CARRIER Re. 18,670

3 Sheets-Sheet 1

Original Filed June 8, 1927

Inventor:

George Henry Wheary

By Ira Milton Jones

Attorney

G. H. WHEARY
Nov. 29, 1932. BAGGAGE CARRIER Re. 18,670
3 Sheets-Sheet 2
Original Filed June 8, 1927
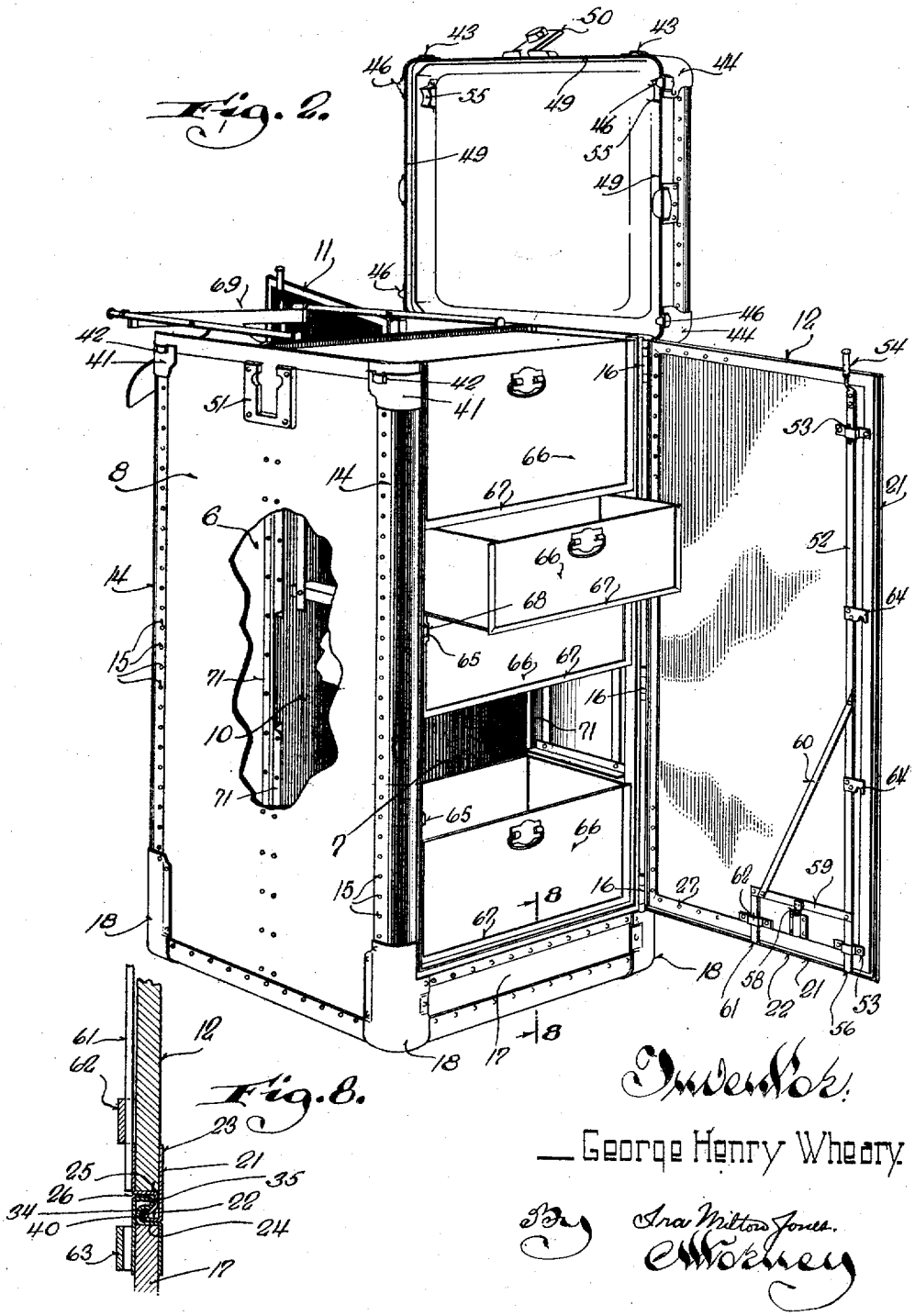
Inventor:
George Henry Wheary
By Ira Milton Jones.
Attorney

G. H. WHEARY

Nov. 29, 1932. BAGGAGE CARRIER Re. 18,670

3 Sheets-Sheet 3

Original Filed June 8, 1927

Inventor:

George Henry Wheary

By Ira Milton Jones

Attorney

Reissued Nov. 29, 1932

Re. 18,670

UNITED STATES PATENT OFFICE

GEORGE HENRY WHEARY, OF RACINE, WISCONSIN, ASSIGNOR TO WHEARY TRUNK COMPANY, OF RACINE, WISCONSIN, A CORPORATION OF WISCONSIN

BAGGAGE CARRIER

Original No. 1,720,158, dated July 9, 1929, Serial No. 197,360, filed June 8, 1927. Application for reissue filed September 17, 1932. Serial No. 633,852.

This invention relates to certain new and useful improvements in baggage carriers and has as an object the provision of a solid bottom wardrobe trunk of improved design having the exterior appearance of a conventional type of trunk.

Another object of this invention resides in the provision of an improved baggage carrier which will be lighter than the baggage carriers now in use and, at the same time, of sturdier construction.

Another object of this invention resides in the provision of an improved door type baggage carrier wherein the door is flush with the outer surrounding surface.

Another object of this invention resides in the provision of an improved solid bottom baggage carrier having its opposed side panels fixed and its front and rear panels hinged to form doors permitting access to either compartment and, at the same time, presenting an unbroken exterior appearance when the doors are closed.

One objectionable feature of baggage carriers of the door type is that access is had to the drawer section from the narrow side instead of from the wide side as in the conventional wardrobe trunk construction and this invention has as an object the provision of an improved solid bottom, door type trunk wherein access is had to the drawer section from its wide side, without sacrifice in strength or in any wise breaking the outward appearance of the trunk.

Another object of this invention resides in the provision of an improved baggage carrier having one or more doors and a hinged top whereby closing of the hinged top locks the door or doors.

Another object of this invention resides in the provision of an improved baggage carrier having a flush door provided with interlocking peripheral connections adapted to be under tension when the door is closed and which will exclude foreign matter at the marginal edges of the door.

Another object of my invention resides in the provision of an improved baggage carrier of the character described having a corner post over which a tubular member is engaged to form a combination binding for the trunk corner and part of an interlocking connection with the adjacent edge of the trunk door.

And a further object of this invention resides in the provision of a door trunk in which the doors are flush with the trunk exterior and are provided with concealed means for tying the edges of the doors to the trunk proper when closed to give added strength thereto.

With the above and other objects in view which will appear as the description proceeds, the invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, is illustrated one complete example of the physical embodiment of this invention constructed according to the best mode so far devised for the practical application of the principles thereof, and in which:

Figure 2 is a perspective view of my improved trunk in open position, parts thereof being broken away to illustrate details of construction;

Figure 8 is a fragmentary sectional view through Figure 2 on the plane of the line 8—8.

Figure 1:
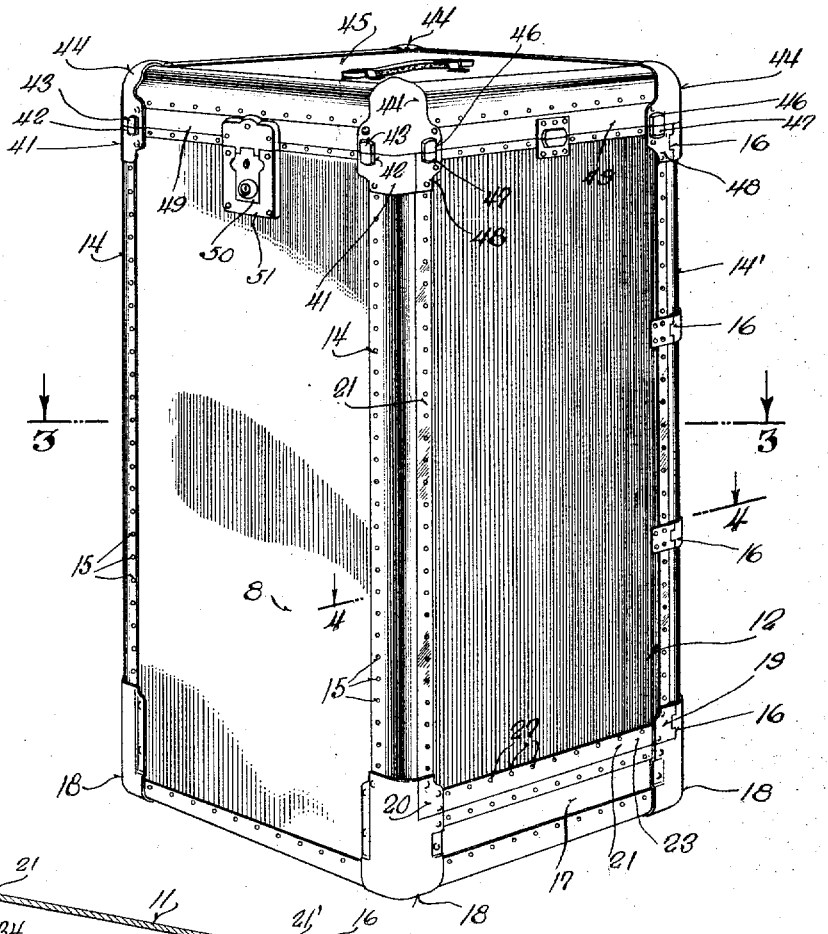
Figure 1 is a perspective view of a trunk embodying my invention.
Figure 3:
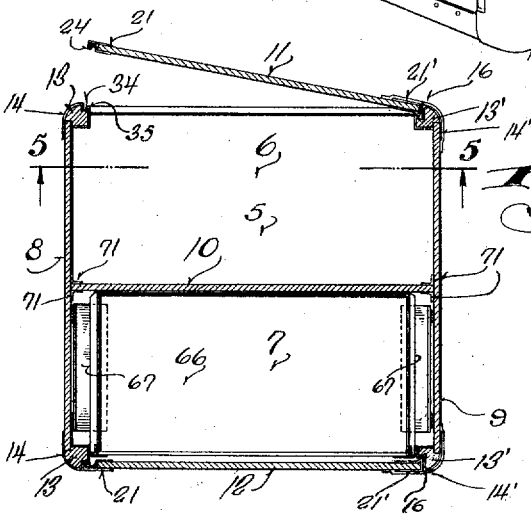
Figure 3 is a transverse sectional view through Figure 1 on the plane of the line 3—3.

Referring now more particularly to the accompanying drawings, the numeral 5 designates the bottom or base panel of a baggage carrier which is preferably of one piece and of a depth equal to the combined depth of the wardrobe and drawer compartments 6 and 7 defined by said panels or walls 8 and 9 and a central partition 10, access being had to the compartments through doors 11 and 12. Corner posts 13 and 13′ preferably of the construction illustrated in my Letters Patent No. 1,119,133, dated December 1, 1914, extend upwardly from the bottom 5 and the panels 8 and 9 are secured between the corner posts 13 and 13′, respectively by rivets or other means and bindings 14 and 14′ extend about the corner posts 13 and 13′, respectively, and over the marginal edges of the panels 8 and 9, to which they are secured by rivets 15 to dress the trunk exterior and impart added strength thereto. The bindings 14 and 14′ form part of reinforcing and interlocking dowel means for the outer marginal edges of the door.

The doors 11 and 12 when closed form the front and rear panels of the trunk and are flush with the corner posts in the manner of the panels 8 and 9. Hinges 16 pivotally mount the doors from the corner posts 13′ and the hinges are arranged with their butts recessed to eliminate all objectionable projections. The doors are further provided with an interlocking connection with the posts 13′, when closed, to exclude foreign matter.

Each door preferably terminates above the bottom 5 a slight distance and the space therebeneath is filled by a panel 17 connecting the posts 13 and 13′ and being reinforced by an improved corner piece 18 at the juncture of each corner post with the base and extending above the top of the adjacent panel 17. The corner pieces 18 have their inner upper corners cut away in register with the openings closed by the doors and the cutout portions of the corner pieces carried by the posts 13′ are filled by the parts 19 of the bottom hinges 16. The cut-away portions of corner pieces 18 secured to the posts 13 are filled by plates 20 fixed to the lowermost outer corners of the doors when closed, so that the continuity of the corner pieces remain unbroken in appearance when the doors are closed.

A reinforcing binder 21 is secured over the outer and bottom marginal edges of each door, which is preferably formed from strip metal bent angularly along a longitudinal line to form an end 22 for the door, then outwardly toward the front face 23 of the binder to form a bead 24 and then turned and extended inwardly over the door edge, as at 25, to, with the bead 24, form a channel 26, the binder then extending along the door inner surface parallel with the outer portion 23, rivets 27 carrying out the effects of rivets 15, securing the binders to the doors.

Figure 4:
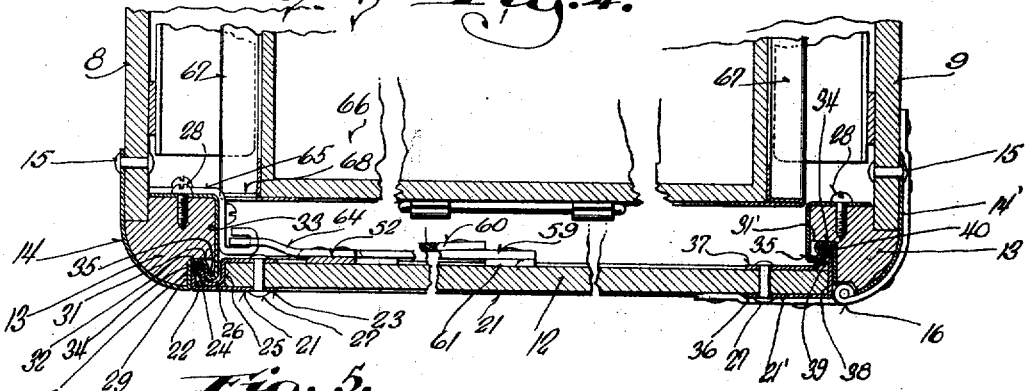
Figure 4 is an enlarged fragmentary, sectional view taken through Figure 1 on the plane of the line 4—4.
Figure 6:
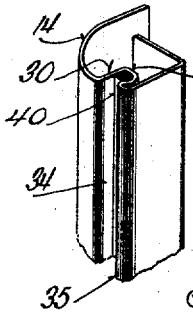
Figure 6 is a fragmentary view of one portion of the corner post binding and reinforcing member.
Figure 7:
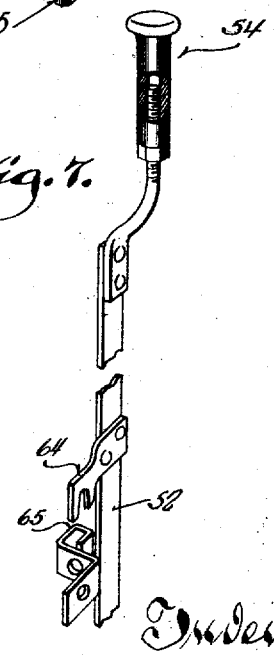
Figure 7 is a fragmentary perspective view of one of the hinged lid actuated door locking devices.

As best illustrated in Figures 4 and 6, the bindings 14 and 14′ are of substantially tubular construction approximately conforming in transverse section to the cross section of the corner posts over which they are engaged from the top, being secured in place by the rivets 15 extending through the outer marginal edges thereof and the panels and by fastenings 28 securing the inner marginal portions thereof to the inner surface of the corner posts adjacent the side panels. The binding 14 conforms with the curvature of the outer surface of the corner post 13 and is bent inwardly along the inwardly extended wall 29 thereof, as at 30, and then transversely along the transverse wall 31 thereof, as at 32. From the wall 32, the binding is curved outwardly and toward the wall 30 and is then folded inwardly upon itself along the wall 33 of the corner post to define a channel 34 and a bead 35 cooperating with the binder 21, bead 24 and channel 26, respectively.

The binding 14′ is substantially identical with the binding 14 with the exception of the specific shape of the bead and channel and that the wall 31′ of the post 13′ is set inwardly beyond that of the corner post 13 by reason of the construction of the binder 21′ secured over the inner marginal edge of the door.

The binding 21′ is of channel shape having its longitudinal marginal portions 36 and 37 embracing the outer and inner surfaces of the door and its end wall 38 the edge of the door, a bead 39 being formed at the juncture of the walls 37 and 38 for engagement in the channel 34 of the binding 14′.

As will be evident, the bead and channel 36 of the bindings 14 and 14′ are so formed that the beads 24 and 39 of the binders 21 and 21′ have a comparatively snug engagement which is such that the door is yieldably secured closed, after the beads and channels are once engaged. The joint between the bindings 14 and 14′ and the binders 21 and 21′ is further protected against foreign matter passing the same by suitable packing 40 inserted in the channels 34.

The binders 14 and 14′ are secured over the corner posts by being slipped thereover from the top prior to the mounting of the uppermost fittings or hardware, to be later described, and completely encase the corner posts to give added rigidity thereto as well as provide the interlocking connections with the door when closed, and the outer surface of the bindings 21 and 21′ form continuations of the binding 14 and 14′, respectively, so that a uniform appearance is obtained.

Suitable fittings 41 are secured at the tops of the corner posts and are formed with dowel sockets 42 in which the dowel members 43 of corner members 44 of a hinged top or lid 45 engage, corner members 44 likewise having dowel members 46 engageable with dowel sockets 47 in members 48 fixed to the upper corners of the doors, the members 48 cooperating to give a uniform appearance to the fittings 41.

The lid or cover 45 is hinged to the panel 9 and is closed after the doors 11 and 12 have been closed and has a peripheral valance 49 which engages over the top marginal edges of the panel 8 and doors 11 and 12 to secure the doors closed at their upper portions, there being means actuated by the movement of the lid over the trunk to lock the outer and lower edges of the doors. The lid 45 may be locked by any conventional means such as a hasp 50 hinged thereto and engageable with a lock plate 51 carried by the panel 8.

Figure 5:
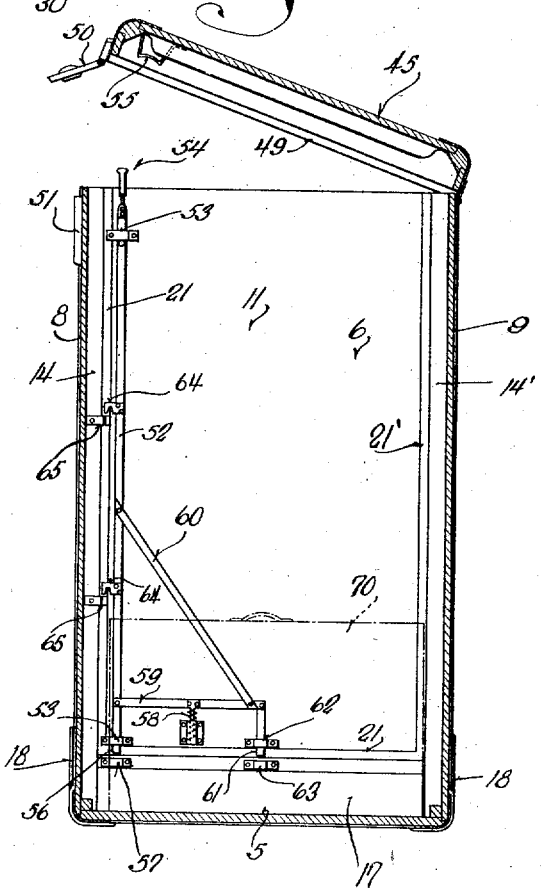
Figure 5 is a vertical sectional view taken through Figure 3 on the plane of the line 5—5 and illustrating the door locking mechanism.

Each door has a vertical rod or bar 52 vertically slidably mounted adjacent its outer marginal edge by guides 53 with its upper end 54 in the path of a metal strike plate 55 carried by the lid. The lower end 56 of the bar is projectable beyond the door bottom to engage a keeper 57 fixed to the adjacent panel 17 as best shown in Figure 5, a spring 58 normally urging the lock actuating bar upwardly so that opening of the lid or top automatically permits the unlocking of the lower portion of the door. Added rigidity is imparted to the locking structure by a transverse member 59 extended from the locking bar and braced by a diagonal member 60 and from which a locking member 61 depends. The member 61 is guided by a member 62 for engagement in a keeper 63 carried by the panel 17.

The locking bars 52 likewise provide for locking the free ends of the doors, having locking members 64 projected laterally therefrom at intervals for engagement behind keepers 65 carried by the corner post 13. The members 64 engage the keepers 65 as the bar 52 is depressed by the closing of the lid to thus firmly secure the marginal edges of the door to the adjacent corner post.

The drawer section 7 is provided with drawers 66, the outer edges of which are provided with laterally projecting flanges 67, and the flanges of the drawers in line with the keepers 65 are notched, as at 68, to permit the movement of the drawers therepast. The wardrobe section 6 of the trunk is likewise provided with a suitable trolley and hangers 69 and means may be provided in the outer lowermost portion thereof for mounting a removable shoe box or other container 70.

The partition 10 dividing the trunk into its respective compartments is preferably secured in place by angle irons or other means 71 carried by the panels 8 and 9 and provide the means for tying the side walls together when the trunk is open, when the trunk is closed an extremely strong structure is obtained by reason of the doors 11 and 12 being tied together at all points.

It will also be apparent that the objections heretofore existing to trunks of the door type, such as the protruding of clumsy and awkward fittings and braces is entirely eliminated as the doors of the trunk are flush with the corner posts and firmly tie the trunk parts together; that the doors have the appearance of the side panels of the trunk and further that the closing of the lid 45 automatically effects the complete locking of the doors and opening of the lid instantly unlocks the trunks.

What I claim as my invention is:

1. In a baggage carrier including side panels and corner posts between which the panels are secured, access being had to the carrier interior between two corner posts, a door for closing the space between the corner posts, and means whereby the door is flush with the corner posts when closed.

2. In a baggage carrier including side panels and corner posts to which the panel side marginal edges are secured, access being had to the carrier interior between two corner posts, a door for closing the space between the corner posts, means whereby the door is flush with the corner posts when closed, and means along the marginal edges of the door when closed for excluding the entrance therepast of foreign matter.

3. In a baggage carrier including side panels and corner posts to which the panel side marginal edges are secured, access being had to the carrier interior between two corner posts, a door for closing the space between the corner posts, means whereby the door is flush with the corner posts when closed, a hinged cover closing the top of the carrier, and means operable upon movement of the hinged cover to closed position to lock the door.

4. In a baggage carrier, a solid bottom member, panels extending upwardly from the bottom member, a hinged lid closing the top of the carrier, means dividing the interior of the carrier into a wardrobe and a drawer section, means hinging the front and rear panels for movement to and from closed position to permit access to the respective compartments, interlocking means between the marginal edges of the hinged panels and the trunk corner posts, and means cooperating with said interlocking means to exclude foreign matter from entering the trunk past the hinged panels.

5. In a baggage carrier construction, a corner post member having recessed faces disposed at right angles with respect to each other in transverse section, a panel adapted to be secured to the corner post with its marginal edge secured to one offset of the corner post, and a door adapted when closed to abut the other offset whereby the outer surface of the door is flush with the outer surface of the corner post.

6. In a baggage carrier construction, a corner post member having recessed faces disposed at right angles with respect to each other in transverse section, a panel to be secured to the corner post with its marginal edge engaging one offset, a door adapted when closed to abut the other offset whereby the outer surface of the door is flush with the outer surface of the corner post member, and a binding strip connecting the panel with the corner post member and having a portion extended about the corner post.

7. In a baggage carrier construction, a corner post member having recessed faces disposed at right angles with respect to each other in transverse section, a panel adapted to be secured to the corner post with its marginal edge engaging one offset, a door adapted when closed to abut the other offset whereby the outer surface of the door is flush with the outer surface of the corner post member, a binding strip connecting the panel with the corner post member and having a portion extended about the corner post, and cooperating means between the door and binder providing an interlocking connection between the door and corner post member when the door is closed.

8. In a baggage carrier construction, a corner post member having recessed faces disposed at right angles with respect to each other in transverse section, a panel secured to the corner post with its marginal edge engaging one offset, a door adapted when closed to abut the other offset whereby the outer surface of the door is flush with the outer surface of the corner post member, and a metallic binder strip formed so as to encase the post member, a part thereof being extended and connected with the panel and another part thereof engaging the adjacent door edge.

9. In a baggage carrier construction, a corner post member having recessed faces disposed at right angles with respect to each other in transverse section, a panel secured to the corner post with its marginal edge engaging one offset, a door adapted when closed to abut the other offset whereby the outer surface of the door is flush with the outer surface of the corner post member, a metallic binder strip formed so as to encase the post member, and cooperating means between the strip and door providing an interlocking engagement therebetween when the door is closed.

10. In a baggage carrier having a one-piece bottom member, a pair of fixed panels extended from opposite sides of the bottom member, a partition member connecting the panels at a medial point and dividing the carrier into sections, doors hinged to the opposite sides of one of said panels and adapted to close the space therebetween, top cover means adapted to be closed over the carrier after the doors have been closed to lock the same at their upper portions, and means for locking the doors closed along their bottoms.

11. In a baggage carrier having a one-piece bottom member, a pair of fixed panels extended from opposite sides of the bottom member, a partition member connecting the panels at a medial point and dividing the carrier into sections, doors hinged to the opposite sides of one of said panels and adapted to close the space therebetween, top cover means adapted to be closed over the carrier after the doors have been closed to lock the same at their upper portions, and means for locking the doors closed along their free edges and their bottoms.

12. In a baggage carrier having a one piece bottom member, a pair of fixed panels extended from opposite sides of the bottom member, a partition member connecting the panels at a medial point and dividing the carrier into sections, doors hinged to the opposite sides of one of said panels and adapted to close the space therebetween, top cover means adapted to be closed over the carrier after the doors have been closed to lock the same at their upper portions, and means for locking the doors closed along their free edges and their bottoms, said means being actuated upon closing of the top cover means.

13. In a baggage carrier of the class described, a pair of corner post members, a door member hinged to one of said corner post members, a locking bolt slidably mounted along the outer free edge of the door member, locking lugs carried by the bolt, keepers carried by the second corner post member and adapted to receive said lugs, and means for actuating said locking member to its operative position.

14. In a baggage carrier of the class described, a pair of corner post members, a door member hinged to one of said corner post members, a locking bolt slidably mounted along the outer free edge of the door member, locking lugs carried by the bolt, keepers carried by the second corner post member and adapted to receive said lugs, means for actuating said locking member to its operative position, a keeper adjacent the bottom edge of the door member, and additional locking means carried by the bolt and engageable with the keeper.

15. In a baggage carrier of the class described, a pair of corner post members, a door member hinged to one of said corner post members, a locking bolt slidably mounted along the outer free edge of the door member, locking lugs carried by the bolt, keepers carried by the second corner post member and adapted to receive said lugs, means for actuating said locking member to its operative position, a keeper adjacent the bottom edge of the door member, additional locking means carried by the bolt and engageable with the keeper, means normally urging the bolt to an inactive position, and a top cover for the carrier adapted in closing to move the bolt against its urging means.

16. In a baggage carrier, a solid bottom member, panels extending upwardly from the bottom member, a hinged lid closing the entire top of the carrier, means dividing the interior of the carrier into a wardrobe and a drawer compartment both of the compartments extending across the entire width of the carrier, certain of said panels being hingedly mounted to permit access to the interior of the compartments, and means on said hingedly mounted panels operable by movement of the hinged lid to closed position to lock the hinged panels closed.

17. In a baggage carrier, a bottom member, panels extending upwardly from the bottom member to form opposite sides of the carrier, partition means connecting the panels to divide the interior of the carrier into a wardrobe and a drawer compartment, a second pair of panels hingedly connected with said first-mentioned panels to form the other two sides of the carrier, and a top connected to one of said first named panels and movable into engagement with all of said panels to retain said movable panels in closed position when said top is in closed position.

18. In a baggage carrier, a bottom member, panels extending upwardly from opposite edges of the bottom member to form two sides of the carrier, partition means rigidly connecting said panels to divide the interior of the carrier into separated compartments one of which is a wardrobe compartment, a closure for each compartment hingedly connected with said first-mentioned panels, said closures forming the other two sides of the carrier, a lid hingedly connected with one of said first-mentioned panels and movable to simultaneously close the tops of said compartments, and means operable by movement of the hinged lid to its closed position and cooperating with means on said closures to secure the compartment closures closed.

19. In a baggage carrier, a solid bottom member, panels extending upwardly from the bottom, a hinged lid closing the top of the carrier, means dividing the interior of the carrier into a wardrobe compartment and a drawer compartment, means in said wardrobe compartment to retain clothes hangers, a plurality of drawers in said drawer compartment, means hinging the front and rear panels for movement to and from closed position to permit access to the respective compartments, corner posts, interlocking means between the marginal edges of the hinged panels and the corner posts, and means on said hinged lid to retain said front and rear panels in closed position when said lid is in closed position.

20. In a baggage carrier, a one piece rectangular bottom member, a pair of side panels extending upwardly from said bottom member on opposite sides thereof, a third panel member joining the side panels and dividing the carrier into substantially rectangular wardrobe and drawer compartments, a door hingedly connected to one of said side panels and spaced from said bottom member to permit access to said wardrobe compartment, a second door hingedly connected to one of said side panels and spaced from said bottom member to permit access to said drawer compartment, and a one piece top member hingedly connected to one of said side panels, and having means thereon to retain said doors in closed position when said top is in closed position.

21. In a baggage carrier, a one piece bottom member, a pair of side panels extending upwardly from said bottom member on opposite sides thereof, a third panel joining the side panels and dividing said carrier into a wardrobe compartment and a drawer compartment, a door hingedly connected to one of said side panels and spaced from said bottom member to permit access to said wardrobe compartment, a second door hingedly connected to one of said side panels, and spaced from said bottom member to permit access to said drawer compartment, a one piece top member hinged to one of said side panels and having means thereon cooperating with means on said doors to lock said doors in closed position when said top is in closed position.

22. In a baggage carrier, a one piece rectangular bottom member, a pair of side panels extending upwardly from said bottom member on opposite sides thereof, a third panel member joining the other two panels and dividing the carrier into substantially rectangular wardrobe and drawer compartments, a door hingedly connected to one of said side panels and spaced from said bottom member to permit access to said wardrobe compartment, a second door hingedly connected to one of said side panels and spaced from said bottom member to permit access to said drawer compartment, and a one piece top member hinged to one of said side panels and having means thereon cooperating with means on said doors to lock said doors in closed position when said panel is in closed position.

23. In a baggage carrier, a one piece bottom member, a pair of side panel members extending upwardly from said bottom member on opposite sides thereof, a third panel extending upwardly from said bottom member and joining said other two panels and dividing said carrier into a wardrobe compartment and a drawer compartment, a door hingedly connected to one of said side panels and spaced from said bottom member to permit access to said wardrobe compartment, a second door hingedly connected to one of said side panels and spaced from said bottom member to permit access to said drawer compartment, and a one-piece top member hingedly connected to one of said panel members, and having means thereon cooperating with means on said doors to retain said doors in closed position when said top is in closed position.

24. In a baggage carrier, a one piece rectangular bottom member, a pair of side panels extending upwardly from said bottom member on opposite sides thereof, a third panel member extending upwardly from said bottom member and joining said other two panels to divide said carrier into substantially rectangular wardrobe and drawer compartments, a door hingedly connected to one of said side panels and spaced from said bottom member to permit access to said wardrobe compartment, a second door hingedly connected to one of said side panels and spaced from said bottom member to permit access to said drawer compartments, and a one piece top member hingedly connected to one of said side panels and having means thereon cooperating with means on said doors to retain said doors in closed position when said top is in closed position.

25. In a baggage carrier, a one piece bottom member, a pair of side panels extending upwardly from said bottom member on opposite sides thereof, a third panel joining said other two panels dividing said carrier into a wardrobe compartment and a drawer compartment, a door hingedly connected to one of said side panels and spaced from said bottom member to permit access to said wardrobe compartment, a second door hingedly connected to said last mentioned side panel and spaced from said bottom member to permit access to said drawer compartment, a one piece top member hingedly connected to said last named side panel.

26. In a baggage carrier, a one piece rectangular bottom member, a pair of side panels extending upwardly from said bottom member on opposite sides thereof, a third panel joining said side panels and dividing the carrier into substantially rectangular wardrobe and drawer compartments, a door hingedly connected to one of said side panels and spaced from said bottom member, to permit access to said wardrobe compartment, a second door hingedly connected to said last mentioned side panel and spaced from said bottom member to permit access to said drawer compartment, and a top member hingedly connected to said last mentioned side panel.

27. In a baggage carrier, a one piece bottom member, a pair of panels extending upwardly from said bottom member on opposite sides thereof, a third panel extending upwardly from said bottom member and joining said side panels to divide said carrier into a wardrobe compartment and a drawer compartment, a door hingedly connected to one of said side panels and spaced from said bottom member to permit access to said wardrobe compartment, a second door hingedly connected to said last mentioned side panel and spaced from said bottom member to permit access to said drawer compartment, and a one piece top member hingedly connected to said last mentioned side panel, and having means thereon to retain said doors in closed position when said door is in closed position.

28. In a baggage carrier, a substantially rectangular one piece bottom member, a pair of side panels extending upwardly from said bottom member on opposite sides thereof, a third panel extending upwardly from said bottom member and joining said side panels to divide said baggage carrier into substantially rectangular wardrobe and drawer compartments, a door hingedly connected with one of said pair of panels and spaced from said bottom member to permit access to said wardrobe compartment, a second door hingedly connected with said last mentioned side panel member and spaced from said bottom member to permit access to said drawer compartment, and a top member hingedly connected to said last mentioned side panel.

29. In a baggage carrier, a substantially rectangular one piece bottom member, a pair of side panels extending upwardly from said bottom member on opposite sides thereof, a third panel extending upwardly from said bottom member and joining said side panels to divide said baggage carrier into substantially rectangular wardrobe and drawer compartments, a door hingedly connected with one of said side panels and spaced from said bottom member to permit access to said wardrobe compartment, a second door hingedly connected with said last mentioned side panel member and spaced from said bottom member to permit access to said drawer compartment, a one piece top member hingedly connected to said last mentioned side panel, and means on said top member cooperating with means on said doors to hold said doors in closed position when said top is in closed position.

30. In a baggage carrier, a bottom member, panels extending upwardly from the bottom member to form opposite sides of the carrier, a partition member connnecting the panels to divide the interior of the carrier into a wardrobe and a drawer compartment, a second pair of panels hingedly connected with the first mentioned panels to form the other two sides of the carrier and a top movable into engagement with all of the panels and means upon one of said panels operable upon closing of said top to lock one of said movable panels in closed position.

31. In a baggage carrier of the character described, a rectangular bottom member, panels extending upwardly from the edges of the bottom member to form the sides of the carrier, one of the panels being movably connected with an adjacent panel to permit access into the interior of the carrier, a top movable into engagement with all of the panels, means on one of said panels operable by said top upon closing thereof to lock said movable panel in closed position.

32. In a baggage carrier of the character described, a bottom member, a first pair of panels extending upwardly from the bottom member to form two sides of the baggage carrier, partition means connecting said panels at medial points therein to divide the carrier into a wardrobe and a drawer compartment, a second pair of panels, said second pair of panels being movable to form a closure for said drawer and wardrobe compartments respectively, a top for the carrier movable into engagement with all of said panels, means on two of said panels operable by the closing of said top to lock said movable panels in closed position.

33. In a baggage carrier of the character described, a bottom member, panels extending upwardly from the opposite edges of the bottom member to form two sides of the carrier, partition means rigidly connecting said panels to divide the interior of the carrier into separate compartments, one of which is a wardrobe compartment, a closure for each compartment hingedly connected with said first mentioned panels, said closures forming the other two sides of the carrier and a top hingedly connected with one of the first mentioned panels and means on said second mentioned panels operable upon closure of said top to lock said panels in closed position.

34. In a baggage carrier of the character described, a bottom member, panels extending upwardly from the opposite edges of the bottom member to form two sides of the carrier, a partition member rigidly connecting said panels to divide the interior of the carrier into separated compartments, one of which is a wardrobe compartment, a closure for each compartment hingedly connected with said first mentioned panels, said closures forming the other two sides of the carrier, a top hingedly connected with one of said first mentioned panels and means on said closures operable upon movement of the hinged top to its closed position to secure the compartment closures closed.

35. In a baggage carrier, a rectangular bottom member, panels extending upwardly from the edges of the bottom member to form the sides of the carrier, one of the panels being movably connected with an adjacent panel to permit access to the interior of the carrier, and a top movable to engagement with all of the panels, means on said top cooperating with means on one of said panels to secure said movable panel in closed position upon closing of said top.

36. In a baggage carrier, a bottom member, a first pair of panels extending upwardly from opposite sides of the bottom member to form two sides of the baggage carrier, partition means connecting the panels at a medial point to divide the interior of the carrier into a wardrobe and a drawer compartment, a second pair of panels extending upwardly from said base, one of said second pair of panel members being movable to form a closure for one compartment, the other of said pair of panel members being movable to form a closure for said other compartment, a lid for the baggage carrier hingedly connected to one of said first named panels and movable to engagement with all of said panels, and means on said lid to retain said movable members in closed position when said lid is in closed position.

In testimony whereof I have hereunto affixed my signature.

GEORGE HENRY WHEARY.